United States Patent
Wise et al.

(10) Patent No.: US 7,623,960 B2
(45) Date of Patent: Nov. 24, 2009

(54) SYSTEM AND METHOD FOR PERFORMING 4-DIMENSIONAL NAVIGATION

(75) Inventors: John A. Wise, Glendale, AZ (US); Blake W. Wilson, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 687 days.

(21) Appl. No.: 11/264,338

(22) Filed: Oct. 31, 2005

(65) Prior Publication Data

US 2007/0100538 A1 May 3, 2007

(51) Int. Cl.
*G01C 21/10* (2006.01)
(52) U.S. Cl. .................. 701/204; 340/973; 340/978; 340/441; 340/461
(58) Field of Classification Search .................. 701/200
See application file for complete search history.

(56) References Cited

U.S. PATENT DOCUMENTS

| | | | | |
|---|---|---|---|---|
| 3,088,107 | A * | 4/1963 | Martienssen et. al. | 701/120 |
| 4,774,670 | A | 9/1988 | Palmieri | |
| 5,051,910 | A | 9/1991 | Liden | |
| 5,121,325 | A * | 6/1992 | DeJonge | 701/123 |
| 6,049,754 | A * | 4/2000 | Beaton et al. | 701/204 |
| 7,302,338 | B2 * | 11/2007 | Petzold et al. | 701/200 |
| 2003/0139876 | A1 * | 7/2003 | Shinagawa | 701/204 |
| 2005/0137758 | A1 | 6/2005 | He et al. | |
| 2007/0100538 | A1 * | 5/2007 | Wise et al. | 701/200 |

FOREIGN PATENT DOCUMENTS

WO 0129512 4/2001

* cited by examiner

*Primary Examiner*—Thomas G Black
*Assistant Examiner*—Shelley Chen
(74) *Attorney, Agent, or Firm*—Ingrassia Fisher & Lorenz, P.C.

(57) ABSTRACT

A system and method are disclosed for computing a vehicle's motion in four dimensions (e.g., three spatial dimensions and time) and reliably predicting the vehicle's arrival time at a predetermined location, by providing a graphical display to an operator of the vehicle's progress that enables the operator to adjust the vehicle's movement and achieve the desired arrival time. Specifically, a system and method are disclosed for computing the movement of an aircraft in four dimensions, predicting its arrival time at a predetermined waypoint, and displaying (in a highly intuitive format) the aircraft's progress in achieving that desired arrival time. The pilot can then adjust the movement (e.g., speed) of the aircraft in accordance with the parameter(s) displayed, in order to achieve the desired arrival time. Thus, for example, numerous aircraft could be scheduled to arrive at a specific final approach waypoint at a predetermined rate (e.g., one aircraft per minute), which would enable the traffic controllers to optimize runway traffic without having to stack the aircraft in holding patterns and thereby waste fuel. Notably, although an example of an aircraft navigation and control system and method is disclosed, the system and method can be implemented for any type of vehicle (e.g., aircraft, spacecraft, ship, submarine, bus, train, automobile, etc.) whose operator desires to reach a particular location at a specified time.

13 Claims, 3 Drawing Sheets

SYSTEM AND METHOD FOR PERFORMING 4-DIMENSIONAL NAVIGATION

FIELD OF THE INVENTION

The present invention relates generally to the field of navigation and control systems, and more specifically, but not exclusively, to an improved navigation system and method that provides real-time, 4-dimensional navigation information for operator displays.

BACKGROUND OF THE INVENTION

In 1995, the Federal Aviation Administration (FAA) initiated its "Free Flight" air traffic modernization program in order to improve airspace efficiency and capacity, and also revolutionize air traffic control. Essentially, the Free Flight program is designed to provide users (e.g., pilots, flight crews, aircraft operators, airlines, etc.) with as much flight mission flexibility as possible, while also enhancing the safety and predictability of the National Airspace System. Advantageously, the Free Flight program is expected to give aircraft operators increased control over their flight missions, and the opportunity to better control their operating expenses as a result. In other words, aircraft operators will benefit financially by having increased autonomy and control over the planning and execution of their flight missions.

Currently, it is the responsibility of FAA air route traffic controllers to determine the specific routes and waypoints used by aircraft to reach their destinations. A waypoint is a fixed location with a specified longitude and latitude. Typically, in order to traverse a route, a pilot navigates to the nearest waypoint, and then to the next waypoint in turn, and so on until the aircraft reaches its destination. Currently, the FAA does not require an aircraft to reach a waypoint at a specific point in time. However, in the future, under the Free Flight program, the FAA will give operators more control over the route selections, but their aircraft will be required to reach specific points at specific times. In other words, under the Free Flight program, an aircraft will be required to arrive reliably at a predetermined location (e.g., waypoint) at a predetermined time, also known as a Required Time of Arrival (RTA).

Notwithstanding the numerous advantages of the Free Flight program, a significant problem has arisen with respect to the capabilities of existing navigation systems that limit the ability of aircraft to reliably meet the air route (waypoint) time constraints imposed. For example, there are numerous onboard aircraft, ship-borne and motor vehicle navigation systems that can calculate and display an Estimated Time of Arrival (ETA). However, there is no navigation system currently available that displays an indication to an operator that allows the operator to easily determine whether or not a required waypoint time constraint can be reliably satisfied. Also, there is no navigation system currently available that provides an interactive indication to an operator of a vehicle's (e.g., aircraft, ship, motor vehicle, etc.) progress in meeting any routing (waypoint) time constraints imposed. Therefore, it would be advantageous to have a system and method that can compute a vehicle's motion in four dimensions (e.g., three spatial dimensions and time) and reliably predict the vehicle's arrival time at a predetermined waypoint, by providing a graphical display to an operator of the vehicle's progress that enables the operator to adjust the vehicle's movement and achieve the desired arrival time. As described in detail below, the present invention provides such a system and method, which resolves the existing navigation and control system problems in reliably meeting routing time constraints imposed and similar other problems.

SUMMARY OF THE INVENTION

The present invention provides a system and method for computing a vehicle's motion in four dimensions (e.g., three spatial dimensions and time) and reliably predicting the vehicle's arrival time at a predetermined location, by providing a graphical display to an operator of the vehicle's progress that enables the operator to adjust the vehicle's movement and achieve the desired arrival time. In accordance with a preferred embodiment of the present invention, a system and method are provided for computing the movement of an aircraft in four dimensions, predicting its arrival time at a predetermined waypoint, and displaying (in a highly intuitive format) the aircraft's progress in achieving that desired arrival time. The pilot can then adjust the movement (e.g., speed) of the aircraft in accordance with the parameter(s) displayed, in order to achieve the desired arrival time. Thus, for example, numerous aircraft using the present invention could be scheduled to arrive at a specific final approach fix (waypoint) at a predetermined rate (e.g., one aircraft per minute), which would enable the air traffic controllers to optimize runway traffic without having to stack the aircraft in holding patterns and thereby waste fuel. Notably, although an example embodiment of an aircraft navigation and control system and method is described, the present invention can be implemented for any type of vehicle (e.g., aircraft, spacecraft, ship, submarine, bus, train, automobile, etc.) whose operator desires to reach a particular location at a specified time.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
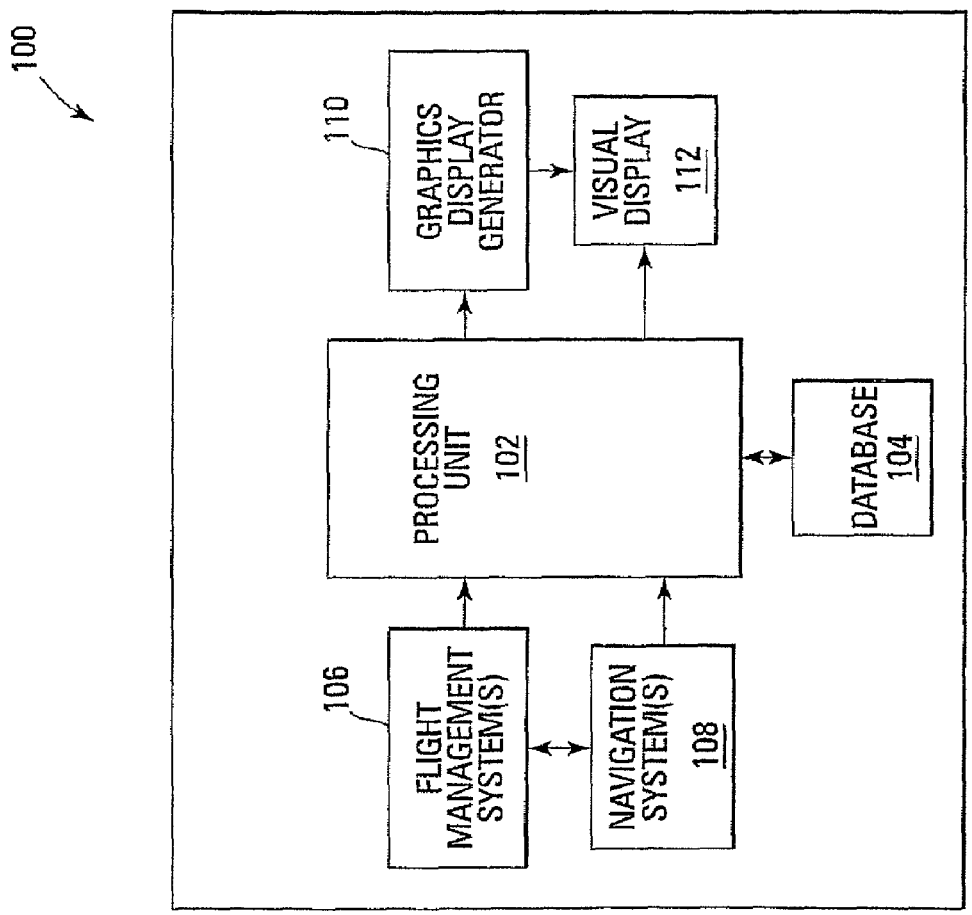
FIG. 1 depicts a block diagram of an example aircraft navigation and control system, which can be used to implement a preferred embodiment of the present invention.

With reference now to the figures, FIG. 1 depicts a block diagram of an example aircraft navigation and control system 100, which can be used to implement a preferred embodiment of the present invention. Essentially, for this example embodiment, system 100 computes the movement of an aircraft in four dimensions (x, y, z, t), predicts its arrival time at a predetermined waypoint, and displays (in a highly intuitive format) the aircraft's progress in achieving that desired arrival time. The pilot can then adjust the movement (e.g., speed, altitude, track, etc.) of the aircraft in accordance with the parameter(s) displayed, in order to achieve the desired arrival time.

For this example embodiment, system 100 includes a processing unit 102, a database 104, a flight management system 106, a navigation system 108, a graphics display generator 110, and a visual display 112. Notably, it should be understood that although system 100 appears in FIG. 1 to be arranged as an integrated system, the present invention is not intended to be so limited and can also include an arrangement whereby one or more of processing unit 102, database 104, flight management system 106, navigation system 108, graphics display generator 110, and visual display 112 is a separate component or a subcomponent of another system located either onboard or external to an aircraft. Also, for example, system 100 can be arranged as an integrated system (e.g., aircraft display system, Primary Flight Display system, etc.) or a subsystem of a more comprehensive aircraft system (e.g., flight management system, navigation and control system, target aiming and control system, collision alert and/or avoidance system, weather avoidance system, etc.). Furthermore, the present invention is not limited to aircraft displays, and system 100 can also be implemented for other types of vehicles' electronic displays, such as, for example, spacecraft navigation displays, ship navigation displays, submarine navigation displays, train navigation displays, motor vehicle navigation displays, etc.).

For this embodiment, processing unit 102 can be a computer processor such as, for example, a microprocessor, digital signal processor, or any suitable processor capable of at least receiving and/or retrieving aircraft flight management information (e.g., from flight management system 106), navigation and control information (e.g., from navigation system 108), terrain information, including waypoint data and coordinate data for airports, runways, natural and man-made obstacles, etc. (e.g., from database 104), generating display control signals for a visual display of the aircraft flight management information, the navigation and control information (including, for example, a zero pitch reference line, one or more heading indicators, tapes for airspeed and altitude, etc.), the terrain information, and sending the generated display control signals to a graphics display generator (e.g., graphics display generator 110) associated with an onboard visual display (e.g., visual display 112).

For example, processing unit 102 can be arranged as a single processor or plurality of processors connected to a data communications bus or system bus. A memory controller/cache can also be connected to the data communications bus or system bus, which can provide an interface between processing unit 102 and a local memory (e.g., RAM, ROM, etc.). A plurality of machine instructions can be stored in the local memory and retrieved and operated on by processing unit 102 to generate the control signals for the graphics display generator 110 and visual display 112. An Input/Output (I/O) bus bridge can also be connected to the data communications bus or system bus, which can provide an interface between processing unit 102 and an I/O bus. Thus, processing unit 102 can receive, retrieve and/or send data via such an I/O bus. In any event, those of ordinary skill in the art will appreciate that the hardware described herein for processing unit 102 in FIG. 1 may vary. As such, the depicted example is provided for illustrative purposes and not meant to imply any architectural limitations with respect to the present invention.

For this example embodiment, system 100 also includes database 104 coupled to processing unit 102 (e.g., via an I/O bus connection). For example, database 104 can be a memory device (e.g., non-volatile memory, disk, drive, tape, optical storage device, mass storage device, etc.) that can store digital target location data, terrain data and waypoint data (e.g., latitudinal and longitudinal data) as either absolute coordinate data or as a function of an aircraft's position. A source for the digital target location data, terrain data, and/or waypoint data stored in database 104 can be, for example, a United States Geological Survey (USGS) map having a resolution of approximately 90 meters, which includes topographical relief information that can be used to apply grid lines following the contour of terrain. As such, database 104 can store a location database that includes data defining the actual geographical boundaries of numerous airports and runways.

Database 104 can also include, for example, a terrain database, which can include the locations and elevations of natural terrain obstacles such as mountains or other elevated ground areas, and also the locations and elevations of man-made obstacles such as radio antenna towers, buildings, bridges, etc. A terrain database stored in database 104 can also include, for example, the boundaries of restricted airspace, restricted elevations for particular airspace, bodies of water, etc. As yet another example, a terrain database stored in database 104 can be a Jeppesen-styled database, which can cover, for example, a 300 by 270 mile area of terrain and include topographical relief information. As still another example, airport and runway location data and terrain data stored in database 104 can be received from an onboard device that senses and maps man-made obstacles (e.g., airports, runways, etc.) and variations in terrain, such as, for example, a Forward Looking Infrared (FLIR) sensor, or an active or passive type of radar device. As another example, airport and runway location data, and other types of high priority target data (e.g., locations of incoming traffic to avoid, constructed waypoints, obstacles in the aircraft's flight path, etc.) can be retrieved and/or received by processing unit 102 from a suitable source of such data, such as, for example, an onboard flight management system database (e.g., a component of flight management system 106), an onboard navigation database (e.g., a component of navigation system 108), an onboard FLIR sensor or radar device, or an external database (e.g., via a data communication up-link).

For this embodiment, system 100 also includes flight management system 106 and navigation system 108 coupled to processing unit 102 (e.g., via a respective I/O bus connection). Notably, flight management system 106 and navigation system 108 are depicted as separate components in the example embodiment of system 100. Alternatively, flight management system 106 and navigation system 108 and/or their functions of flight management, navigation and control can be combined in one system (e.g., in flight management system 106), or navigation system 108 can be a subsystem of flight management system 106. In any event, flight management system 106 and/or navigation system 108 can provide navigation data associated with the aircraft's current position and flight direction (e.g., heading, course, track, etc.) to processing unit 102. As such, navigation system 108 can include, for example, an inertial navigation system, a satellite navigation system (e.g., Global Positioning System) receiver, VLF/OMEGA, Loran C, VOR/DME, DME/DME, IRS, aircraft attitude sensors, or the navigation information can come from flight management system 106. The navigation data provided to processing unit 102 can also include information about the aircraft's airspeed, ground speed, altitude (e.g., relative to sea level), pitch, and other important flight information if such information is desired. In any event, for this example embodiment, flight management system 106 and/or navigation system 108 can include any suitable position and direction determination devices that are capable of providing processing unit 102 with at least an aircraft's current position (e.g., in latitudinal and longitudinal form), the real-time direction (heading, course, track, etc.) of the aircraft in its flight path, and other important flight information (e.g., airspeed, altitude, pitch, attitude, etc.).

For this embodiment, system 100 also includes graphics display generator 110 coupled to processing unit 102 (e.g., via an I/O bus connection) and visual display 112. Visual display 112 can also be coupled to processing unit 102 (e.g., via an I/O bus connection). For example, visual display 112 may include any device or apparatus suitable for displaying various types of computer-generated symbols and information, in an integrated, multi-color or monochrome form, representing one or more of pitch, heading, flight path, airspeed, altitude, targets, waypoints, terrain, flight path marker data, and notably, a graphical indication of the aircraft's progress in arriving at a predetermined location (e.g., waypoint) at a predetermined time. Using aircraft position, direction (e.g., heading, course, track, etc.), speed data retrieved (or received) from flight management system 106 and/or navigation system 108, wind data (e.g., speed, direction) and terrain (e.g., waypoint) data retrieved (or received) from database 104, processing unit 102 executes one or more algorithms (e.g., implemented in software) for determining the current position of the host aircraft, its heading (course, track, etc.), and computing an ETA for a predetermined location (e.g. waypoint) based on the aircraft's current speed. Processing unit 102 then generates a plurality of display control signals representing, among other things, a graphical indication showing the aircraft's progress in arriving at a predetermined location (e.g., waypoint) at a predetermined time, and sends the plurality of display control signals to visual display 112 via graphics display generator 110. Preferably, for this embodiment, visual display 112 is an aircraft cockpit, multi-color display (e.g., a Primary Flight Display). Graphics display generator 110 interprets the received plurality of display control signals and generates suitable display symbols, which are presented on a screen or monitor of visual display 112.

Notably, although an existing cockpit display screen may be used to display the above-described flight information symbols and data, the present invention is not intended to be so limited and can include any suitable type of display medium capable of visually presenting multi-colored or monochrome flight information for a pilot or other flight crew member. As such, many known display monitors are suitable for displaying such flight information, such as, for example, various CRT and flat-panel display systems (e.g., CRT displays, LCDs, OLED displays, plasma displays, projection displays, HDDs, HUDs, etc.). For example, visual display 112 can be implemented as a heads-down Primary Flight Display by a DU-1080 Display Unit or DU-1310 Display Unit, which are color active matrix LCD-based devices produced by Honeywell International, Inc. of Morristown, N.J. Also, an example HUD that can be used for visual display 112 is the HUD2020 device also produced by Honeywell International, Inc.

For this example embodiment, graphics display generator 110 can be configured to provide to a screen or monitor of visual display 112 (e.g., responsive to operations of processing unit 102) at least visual symbols (e.g., preferably, but not necessarily, in graph form) that represent the aircraft's current speed, and also indicate to what extent the aircraft's speed should be increased or decreased in order for the aircraft to arrive at a predetermined location (e.g., waypoint, waypoint and altitude, etc.) at a predetermined time. The predetermined location data may include, for example, data retrieved or received from a navigation database, traffic and collision avoidance system, up-linked data from an external database, data from a FLIR sensor or radar device, and/or any other suitable source of location information useful to a pilot or other flight crew member. The current speed data may include, for example, data from an onboard inertial guidance system, navigation system, flight management system, etc. For this example embodiment, graphics display generator 110 (e.g., responsive to operations of processing unit 102) can render a multi-colored (or monochrome) image on a screen of visual display 112, of a plurality of rectangular symbols that indicate the aircraft's current speed and to what extent the aircraft's speed should be increased or decreased in order for the aircraft to reach a predetermined location at a predetermined time, along with relevant navigation information (e.g., suitable symbols representing locations of man-made obstacles and natural obstacles, and other typical flight management information, etc.). Graphics display generator 110 (e.g., responsive to operations of processing unit 102) may also render multi-colored or monochromatic images of terrain and weather data on the screen of visual display 112.

Figure 2:
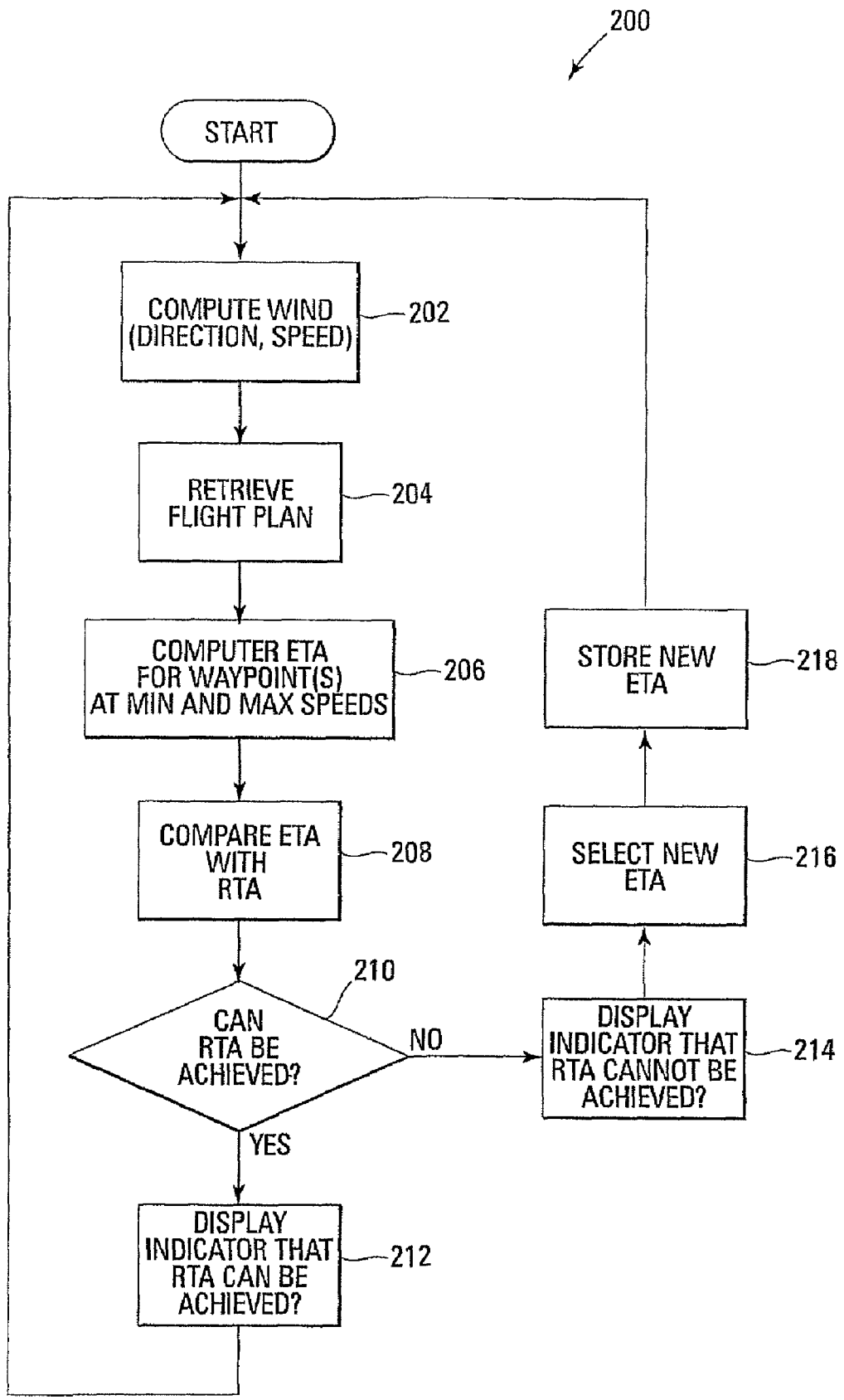
FIG. 2 depicts a flow chart showing an exemplary method for computing the movement of an aircraft in four dimensions, predicting its arrival time at a predetermined location, and displaying on an electronic display (in a highly intuitive format) the aircraft's progress in achieving that desired arrival time, in accordance with a preferred embodiment of the present invention.

FIG. 2 depicts a flow chart showing an exemplary method 200 for computing the movement of an aircraft in four dimensions, predicting its arrival time at a predetermined location (e.g., waypoint), and displaying on an electronic display (in a highly intuitive format) the aircraft's progress in achieving that desired arrival time, in accordance with a preferred embodiment of the present invention. The pilot can then adjust the movement (e.g., speed) of the aircraft in accordance with the parameter(s) displayed, in order to achieve the desired arrival time. If the aircraft is incapable of reaching the predetermined location at the predetermined time, then an indicator is displayed that informs the pilot that the desired arrival time for that waypoint cannot be achieved. In this regard, FIGS. 3A-3D are related drawings showing pictorial representations of a portion of a visual display (e.g., presentation for visual display 112 in FIG. 1), which further illustrate the example method 200 shown in FIG. 2.

Referring now to FIGS. 1, 2, and 3A-3D for this example embodiment, method 200 begins by a processing unit (e.g., processing unit 102) determining the current wind direction and speed that is affecting the movement of the host aircraft (step 202). For example, processing unit 102 can retrieve this wind information from flight management system 106, navigation system 108, and/or a communications data uplink from an external weather information database (e.g., U.S. National Weather Service database). Next, processing unit 102 retrieves (e.g., from database 104) pertinent flight plan data for the host aircraft, which includes, for example, waypoint data for each leg of the selected flight plan (step 204). For example, the flight plan data selected for a specific flight mission may be stored onboard (e.g., in database 104) prior to the aircraft's departure.

The onboard processing unit (e.g., processing unit 102) then determines the host aircraft's current position (e.g., data received from flight management system 106 and/or navigation system 108), selects the next location (e.g., waypoint) in the flight plan relative to the aircraft's current position, and computes an ETA for that next location based on the aircraft's speed (if necessary, also considering other parameters such as heading, course, track, etc.) and the retrieved wind data (step 206). Notably, for this example embodiment, the processing unit computes a range of ETAs, with the lower end of the range limited by the slowest possible speed the aircraft can achieve, and the higher end of the range limited by the highest possible speed that the aircraft can achieve. Next, the processing unit determines whether or not there is a desired and/or required arrival time associated with that selected location (e.g., next waypoint), and if so, the processing unit compares the computed ETA(s) with the desired/required arrival time or RTA (step 208).

The onboard processing unit then determines whether or not the desired/required arrival time (e.g., RTA) for the selected location can be achieved (step 210). For this example embodiment, the processing unit makes this determination based on the comparisons of the desired/required arrival time with the entire range of computed ETAs. Also, the processing unit can consider other pertinent parameters, such as, for example, a range of locations where the aircraft can arrive at a predetermined time, without violating certain conditions (e.g., staying in accordance with FARs, not surpassing the mechanical capabilities of the aircraft, such as engine overheating, etc.). As such, if the host aircraft is operationally and mechanically capable of reaching the selected location (e.g., waypoint) at the desired/required arrival time, then the processing unit sends a plurality of control signals to the graphics display generator (e.g., graphics display generator 110) to generate an indicator for display (e.g., on a screen of visual display 112) that shows an operator that the desired/required arrival time can be achieved (step 212). The flow then returns to step 202. For illustrative purposes, two examples of such a (highly intuitive) display are shown in FIGS. 3A and 3B.

Figure 3A:
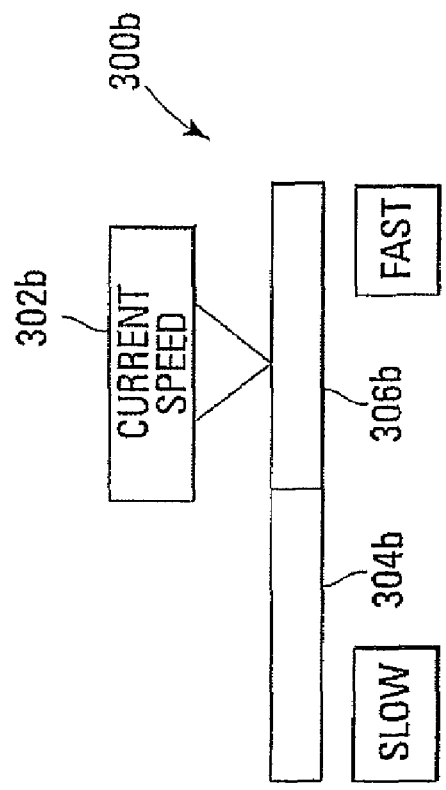
FIGS. 3A-3D are related drawings showing pictorial representations of a portion of a visual display, which further illustrate the example method shown in FIG. 2.

Referring to the example display 300a shown in FIG. 3A, for this embodiment, this display includes a first rectangle 302a that indicates the host aircraft's current speed (e.g., can indicate the aircraft's actual airspeed, or just the words "current speed"), and a second rectangle 304a and third rectangle 306a that indicate the entire range of computed ETAs (e.g., from step 206). Thus, display 300a indicates to an operator (e.g., pilot) that the current speed of the host aircraft is too slow to achieve the desired/required arrival time, but the aircraft can achieve that desired/required arrival time with a relatively small acceleration. The pilot can then increase the aircraft's speed until the current speed indicator 302a coincides substantially with the junction between the second rectangle 304a and third rectangle 306a.

Figure 3C:
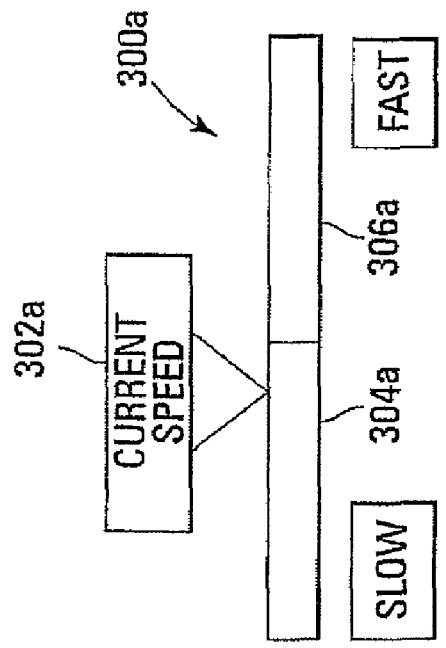
Figure 3B:
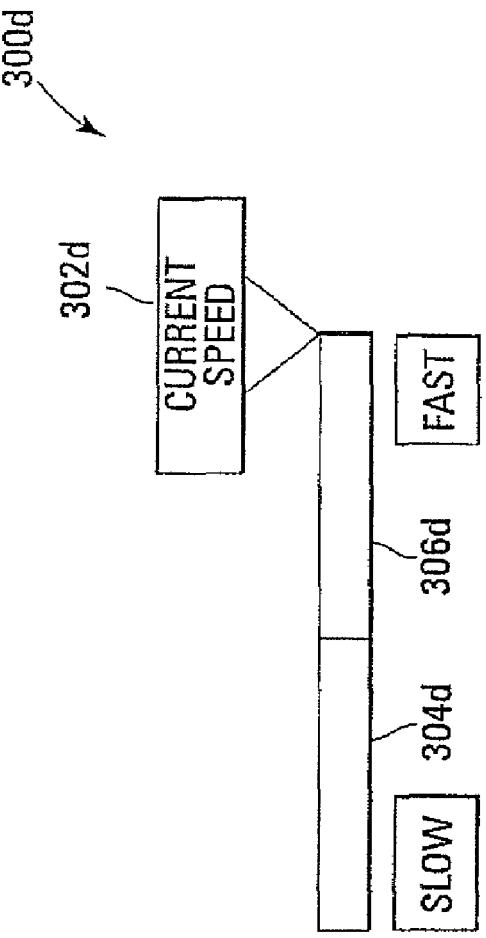

Similarly, referring to the example display 300b shown in FIG. 3B, for this embodiment, this display includes a first rectangle 302b that indicates the host aircraft's current speed, and a second rectangle 304b and third rectangle 306b that indicate the entire range of computed ETAs. Thus, display 300b indicates to an operator that the current speed of the host aircraft is too fast to achieve the desired/required arrival time, but the aircraft can achieve that desired/required arrival time with a relatively small deceleration. The pilot can then decrease the aircraft's speed until the current speed indicator 302b coincides substantially with the junction between the second rectangle 304b and third rectangle 306b.

Returning to step 210 in FIG. 2, if the onboard processing unit (e.g., processing unit 102) determines that the host aircraft is not operationally or mechanically capable of reaching the selected location (e.g., waypoint) at the desired/required arrival time, then the processing unit sends a plurality of control signals to the graphics display generator (e.g., graphics display generator 110) to generate an indicator for display (e.g., on a screen of visual display 112) that shows an operator that the desired/required arrival time cannot be achieved (step 214). For illustrative purposes, two examples of such an intuitive display are shown in FIGS. 3C and 3D.

Referring to the example display 300c shown in FIG. 3C, for this embodiment, this display also includes a first rectangle 302c that indicates the host aircraft's current speed, and a second rectangle 304c and third rectangle 306c that indicate the entire range of computed ETAs (e.g., from step 206). However, in this case, the current speed indicator 302c is shown pegged to the lower limit of rectangle 304c. Thus, display 300c indicates to an operator that the host aircraft is unable to achieve the desired/required arrival time, because the highest speed available to the aircraft is inadequate to achieve that desired/required arrival time. In other words, if the desired/required speed falls outside the available speed range of that aircraft, then the current speed indicator 302c is shown pegged to the appropriate end of the display (slowest end of rectangle 304c in this example), and the color or shading of the current speed indicator 302c can be changed to further accentuate this condition. In this case, for example, the operator can inform an air traffic controller that the aircraft is unable to achieve the desired/required arrival time.

Figure 3D:
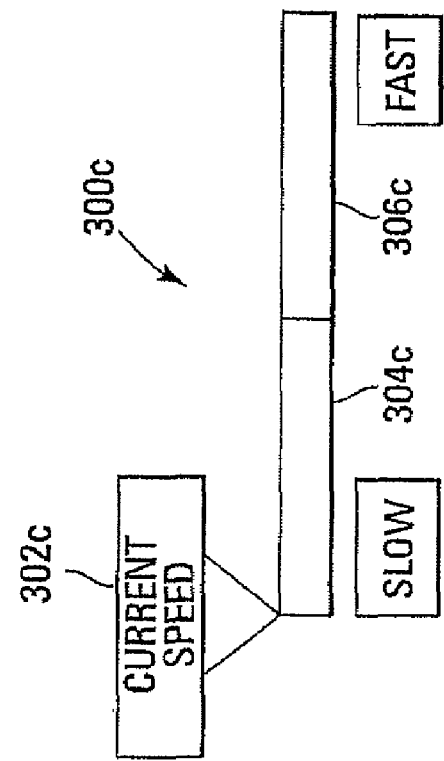

Similarly, referring to the example display 300d shown in FIG. 3D, for this embodiment, this display also includes a first rectangle 302d that indicates the host aircraft's current speed, and a second rectangle 304d and third rectangle 306d that indicate the entire range of computed ETAs (e.g., from step 206). However, in this case, the current speed indicator 302d is shown pegged to the upper limit of rectangle 306d. Thus, display 300d indicates to an operator that the host aircraft is unable to achieve the desired/required arrival time, because the lowest speed available to the aircraft is inadequate to achieve that desired/required arrival time. Again, if the desired/required speed falls outside the available speed range of that aircraft, then the current speed indicator 302d is shown pegged to the appropriate end of the display (fastest end of rectangle 306d in this case), and the color or shading of the current speed indicator 302d can be changed to further accentuate this condition. Again, for example, the operator can inform an air traffic controller that the aircraft is unable to achieve the desired/required arrival time.

Returning to method 200 shown in FIG. 2, at step 216, the onboard processing unit (e.g., responsive to a request by the operator) can select a new ETA for another predetermined location (e.g., next waypoint in the flight plan). As an alternative, the operator can select a location/waypoint that is not included in the stored flight plan, and the processing unit can determine an ETA (e.g., with minimum and maximum speeds) for that selected location. For example, the pilot of an aircraft may desire to negotiate with an air traffic controller and request approval to move to a different waypoint than those included in the approved flight plan. In response to the pilot's request, the air traffic controller can impose an RTA for that new waypoint, and the operator can view the intuitive display to determine (e.g., and report back to the air traffic controller) whether or not that RTA can be achieved. Next, the processing unit stores the new ETA in onboard memory (step 218), and the flow returns to step 202.

It is important to note that while the present invention has been described in the context of a fully functioning navigation and control system and method, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular navigation and control system and method.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for performing 4-dimensional navigation within a vehicle, comprising:
    means for receiving navigation information;
    a processing unit coupled to the means for receiving navigational information, said processing unit operable to:
        estimate a range of arrival times to at least one predetermined location from said navigation information,
        compare the range of estimated arrival times for said at least one predetermined location with a predetermined time of arrival associated with said at least one predetermined location, and
        determine if said range of estimated arrival times includes said predetermined time of arrival;
        generate display control signals that include signals delimiting said range of estimated arrival times and signals delimiting a current speed; and
    a display unit coupled to receive the display control signals from said processing unit, said display unit including an electronic display and being responsive to said display control signals that also render said range of estimated arrival times at a specific position on said electronic display and render said current speed indicator on said display such that the position of the speed indicator on the display conditionally moves within and relative to the position of said range of estimated arrival times on the display.

2. The system of claim 1, wherein said vehicle is an aircraft.

3. The system of claim 1, wherein said vehicle is at least one of a ship, submarine, train, bus, truck and automobile.

4. The system of claim 1, wherein said processing unit, said means for receiving navigation information and said display unit are located onboard an aircraft.

5. The system of claim 1, wherein said range of estimated arrival times is measured in absolute time.

6. The system of claim 1, wherein said predetermined time of arrival comprises a Required Time of Arrival.

7. The system of claim 1, wherein said range of estimated arrival times is measured in relative time.

8. The system of claim 1, wherein said means for receiving navigation information comprises a flight management system.

9. The system of claim 1, wherein said processing unit is further operable to:
    display an indicator representing an inability of said vehicle to arrive at said at least one predetermined location at said predetermined time of arrival, if said range of estimated arrival times does not include said predetermined time of arrival.

10. A system for performing 4-dimensional navigation within a vehicle, comprising:
    means for receiving navigation information;
    means for determining a current location and a current speed of said vehicle;
    means for retrieving data associated with at least one predetermined location of a plurality of predetermined locations;
    means for estimating, for said vehicle, a range of arrival times for said at least one predetermined location;
    means for comparing said range of estimated arrival times for said at least one predetermined location with a predetermined time of arrival associated with said at least one predetermined location;
    means for determining if said range of estimated arrival times includes said predetermined time of arrival; and
    means for displaying an indicator representing a capability of said vehicle to arrive at said at least one predetermined location at said predetermined time of arrival said indicator including a symbol representing said range of estimated arrival times of said vehicle and a symbol representing said current speed of said vehicle wherein the position of said speed symbol within the indicator on the means for displaying moves relative to the position of said range of estimated arrival times within the indicator on the means for displaying.

11. The system of claim 10, further comprising:
means for displaying an alarm representing an inability of said vehicle to arrive at said at least one predetermined location at said predetermined time of arrival, if said range of estimated arrival times does not include said predetermined time of arrival.

12. A computer program product, comprising:
    a computer-usable medium having computer-readable code embodied therein for configuring a computer processor, the computer program product comprising:
    a first executable computer-readable code configured to cause a computer processor to receive navigation information for a vehicle;
    a second executable computer-readable code configured to cause a computer processor to determine a current location of said vehicle;
    a third executable computer-readable code configured to cause a computer processor to retrieve at least one predetermined location of a plurality of predetermined locations;
    a fourth executable computer-readable code configured to cause a computer processor to estimate, for said vehicle, a range of arrival times for said at least one predetermined location, said range of arrival times associated with a minimum value of said navigation information and a maximum value of said navigation information;
    a fifth executable computer-readable code configured to cause a computer processor to compare said range of estimated arrival times for said at least one predetermined location with a predetermined time of arrival associated with said at least one predetermined location;
    a sixth executable computer-readable code configured to cause a computer processor to determine if said range of estimated arrival times includes said predetermined time of arrival; and
    a seventh executable computer-readable code configured to cause a computer processor to display within an electronic display an indicator array representing a capability of said vehicle to arrive at said at least one predetermined location at said predetermined time of arrival, wherein said indicator array provides a speed indicator and provides a second indicator displaying said range of estimated arrival times, wherein further the position of said speed indicator on the electronic display moves relative to the position of said second indicator on the display.

13. The computer program product of claim 12, further comprising:

an eighth executable computer-readable code configured to cause a computer processor to display an indicator representing an inability of said vehicle to arrive at said at least one predetermined location at said predetermined time of arrival.

* * * * *

UNITED STATES PATENT AND TRADEMARK OFFICE
CERTIFICATE OF CORRECTION

PATENT NO.      : 7,623,960 B2  
APPLICATION NO. : 11/264338  
DATED           : November 24, 2009  
INVENTOR(S)     : Wise et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 841 days.

Signed and Sealed this

Twenty-sixth Day of October, 2010

David J. Kappos  
*Director of the United States Patent and Trademark Office*